US 11,403,670 B2

(12) United States Patent
Ogawa et al.

(10) Patent No.: US 11,403,670 B2
(45) Date of Patent: Aug. 2, 2022

(54) INFORMATION PROCESSING DEVICE, INFORMATION PROCESSING SYSTEM, AND INFORMATION PROCESSING METHOD FOR COLLECTING INFORMATION RELATED TO ADVERTISEMENT ACTIVITY

(71) Applicant: TOYOTA JIDOSHA KABUSHIKI KAISHA, Toyota (JP)

(72) Inventors: Toshinari Ogawa, Nagoya (JP); Kohta Tarao, Nagoya (JP); Shinya Kijima, Nagoya (JP); Osamu Fukawatase, Miyoshi (JP); Koji Yasui, Toyota (JP); Toshiyuki Kobayashi, Miyoshi (JP); Hitomi Nakatani, Toyota (JP); Kuniaki Jinnai, Nagoya (JP); Nobuki Hayashi, Nisshin (JP); Masahiro Nagano, Toyota (JP); Akihiro Ito, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 16/950,300

(22) Filed: Nov. 17, 2020

(65) Prior Publication Data
US 2021/0233116 A1      Jul. 29, 2021

(30) Foreign Application Priority Data
Jan. 23, 2020   (JP) .............................. JP2020-008991

(51) Int. Cl.
*G06Q 30/02*       (2012.01)
*B62D 63/02*       (2006.01)
*G06V 40/20*       (2022.01)

(52) U.S. Cl.
CPC ....... *G06Q 30/0266* (2013.01); *B62D 63/025* (2013.01); *G06Q 30/0261* (2013.01); *G06Q 30/0269* (2013.01); *G06V 40/20* (2022.01)

(58) Field of Classification Search
CPC ....................................................... G06Q 30/02
See application file for complete search history.

(56) References Cited

U.S. PATENT DOCUMENTS

| 2008/0167806 | A1* | 7/2008 | Wheeler | ................ G01C 21/26 |
| | | | | 701/532 |
| 2009/0157302 | A1* | 6/2009 | Tashev | ............... G06Q 30/0273 |
| | | | | 701/467 |

(Continued)

FOREIGN PATENT DOCUMENTS

WO    WO 2018/230720 A1    12/2018

*Primary Examiner* — Vincent M Cao
(74) *Attorney, Agent, or Firm* — Oblon, McClelland, Maier & Neustadt, L.L.P.

(57) ABSTRACT

The information processing device includes a controller that executes acquiring at least one of first information related to advertisement activity from a second unit that is usable as a vehicle cabin of a vehicle and is disposed separately from a first unit having a drive unit of the vehicle, the second unit being provided for the advertisement activity, and second information related to a movement of a person within a first predetermined range from a place where the second unit is disposed, and instructing the first unit to move the second unit to a movement destination decided based on at least one of the acquired first information and the acquired second information.

17 Claims, 10 Drawing Sheets

(56) References Cited

U.S. PATENT DOCUMENTS

| | | | |
|---|---|---|---|
| 2014/0145934 A1* | 5/2014 | Hayashida | G06Q 30/02 |
| | | | 345/156 |
| 2015/0348112 A1* | 12/2015 | Ramanujam | G06Q 30/0266 |
| | | | 705/14.63 |
| 2017/0270560 A1* | 9/2017 | Duggal | G06Q 30/0242 |
| 2017/0329329 A1* | 11/2017 | Kamhi | G05D 1/0061 |
| 2018/0206612 A1* | 7/2018 | Bartholomew | A45D 44/005 |
| 2019/0241067 A1* | 8/2019 | Kristiansen | B60P 1/00 |
| 2021/0125227 A1* | 4/2021 | Lee | G06Q 30/0246 |

* cited by examiner

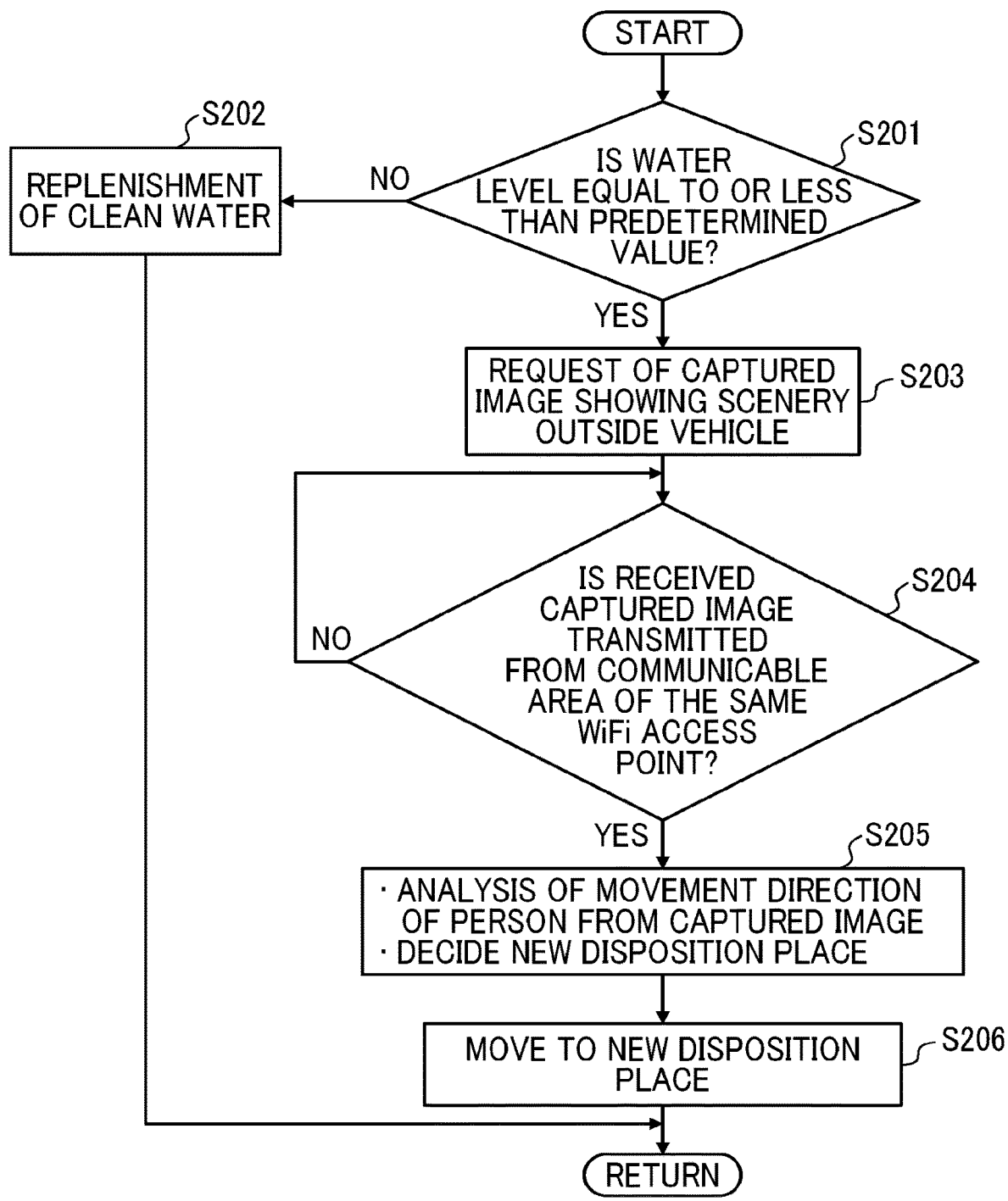

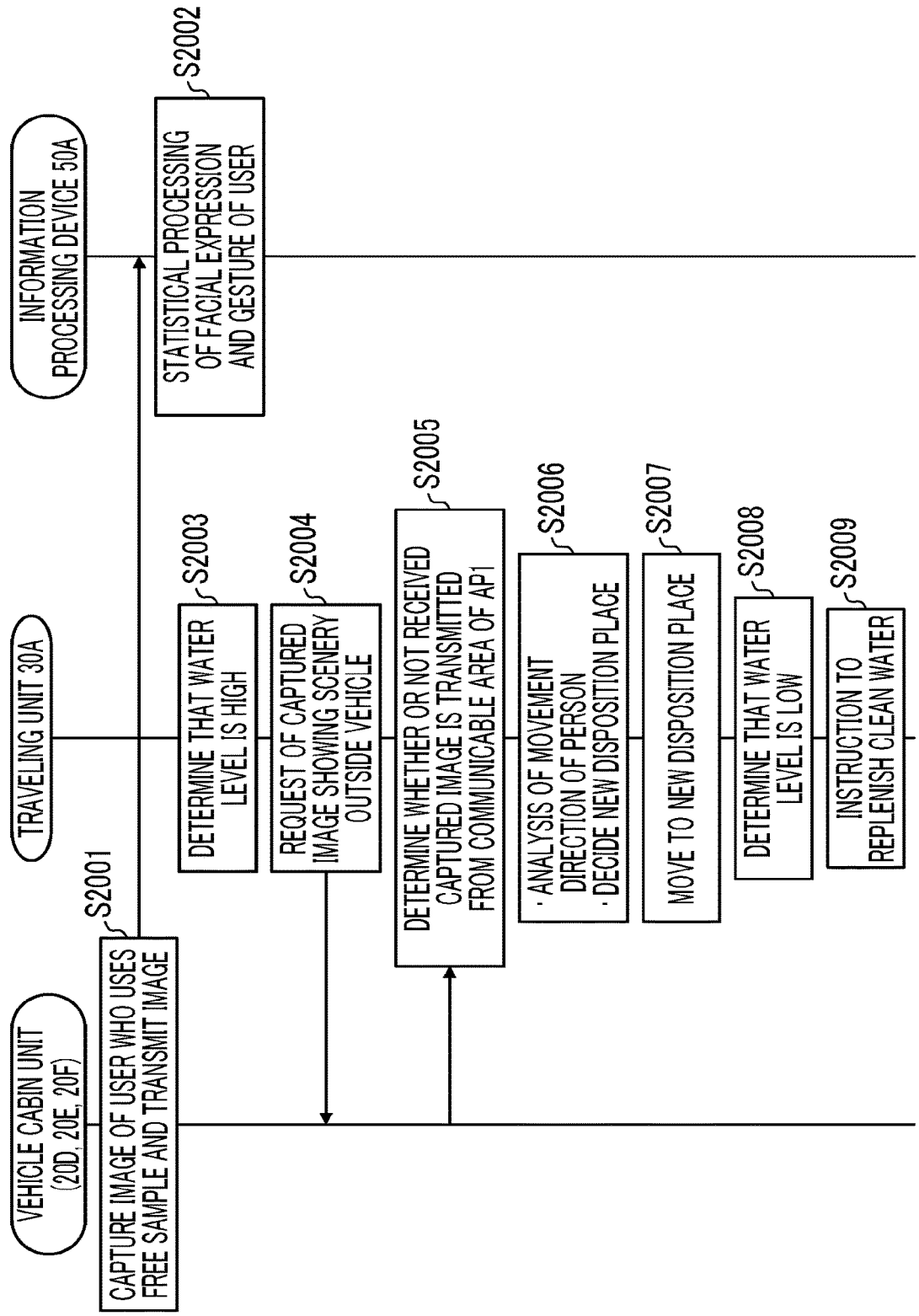

INFORMATION PROCESSING DEVICE, INFORMATION PROCESSING SYSTEM, AND INFORMATION PROCESSING METHOD FOR COLLECTING INFORMATION RELATED TO ADVERTISEMENT ACTIVITY

INCORPORATION BY REFERENCE

The disclosure of Japanese Patent Application No. 2020-008991 filed on Jan. 23, 2020 including the specification, drawings and abstract is incorporated herein by reference in its entirety.

BACKGROUND

1. Technical Field

The present disclosure relates to an information processing device, an information processing system, and an information processing method.

2. Description of Related Art

An autonomous driving vehicle including a traveling unit having no vehicle cabin and a structure detachably attached to the upper portion of the traveling unit is disclosed (for example, WO 2018/230720).

SUMMARY

One aspect of the disclosure is to provide a technique to improve the efficiency of collecting information related to advertisement activity by using a unit that is usable as a vehicle cabin of a vehicle.

A first aspect of the present disclosure relates to an information processing device. The information processing device includes a controller that executes acquiring at least one of first information related to advertisement activity from a second unit that is usable as a vehicle cabin of a vehicle and is disposed separately from a first unit having a drive unit of the vehicle, the second unit being provided for the advertisement activity, and second information related to a movement of a person within a first predetermined range from a place where the second unit is disposed, and instructing the first unit to move the second unit to a movement destination decided based on at least one of the acquired first information and the acquired second information.

A second aspect of the present disclosure relates to an information processing system. The information processing system includes a first unit having a drive unit of a vehicle, a second unit that is usable as a vehicle cabin of the vehicle and is disposed separately from the first unit, and a controller that executes acquiring at least one of first information related to advertisement activity from the second unit that is provided for the advertisement activity or second information related to a movement of a person within a first predetermined range from a place where the second unit is disposed, and instructing the first unit to move the second unit to a movement destination decided based on at least one of the acquired first information and the acquired second information.

A third aspect of the present disclosure relates to an information processing method. The information processing method includes executed by a computer including acquiring at least one of first information related to advertisement activity from a second unit that is usable as a vehicle cabin of a vehicle and is disposed separately from a first unit having a drive unit of the vehicle, the second unit being provided for the advertisement activity, and second information related to a movement of a person within a first predetermined range from a place where the second unit is disposed, and instructing the first unit to move the second unit to a movement destination decided based on at least one of the acquired first information and the acquired second information.

According to the present disclosure, it is possible to provide the technique to improve the efficiency of collecting the information related to the advertisement activity by using the unit that is usable as the vehicle cabin of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 shows an example of a flowchart of information collection executed by a control device according to the second embodiment; and FIG. 10 shows an example of a flowchart of processing executed by the entire information collection system according to the second embodiment.

DETAILED DESCRIPTION OF EMBODIMENTS

Figure 1:
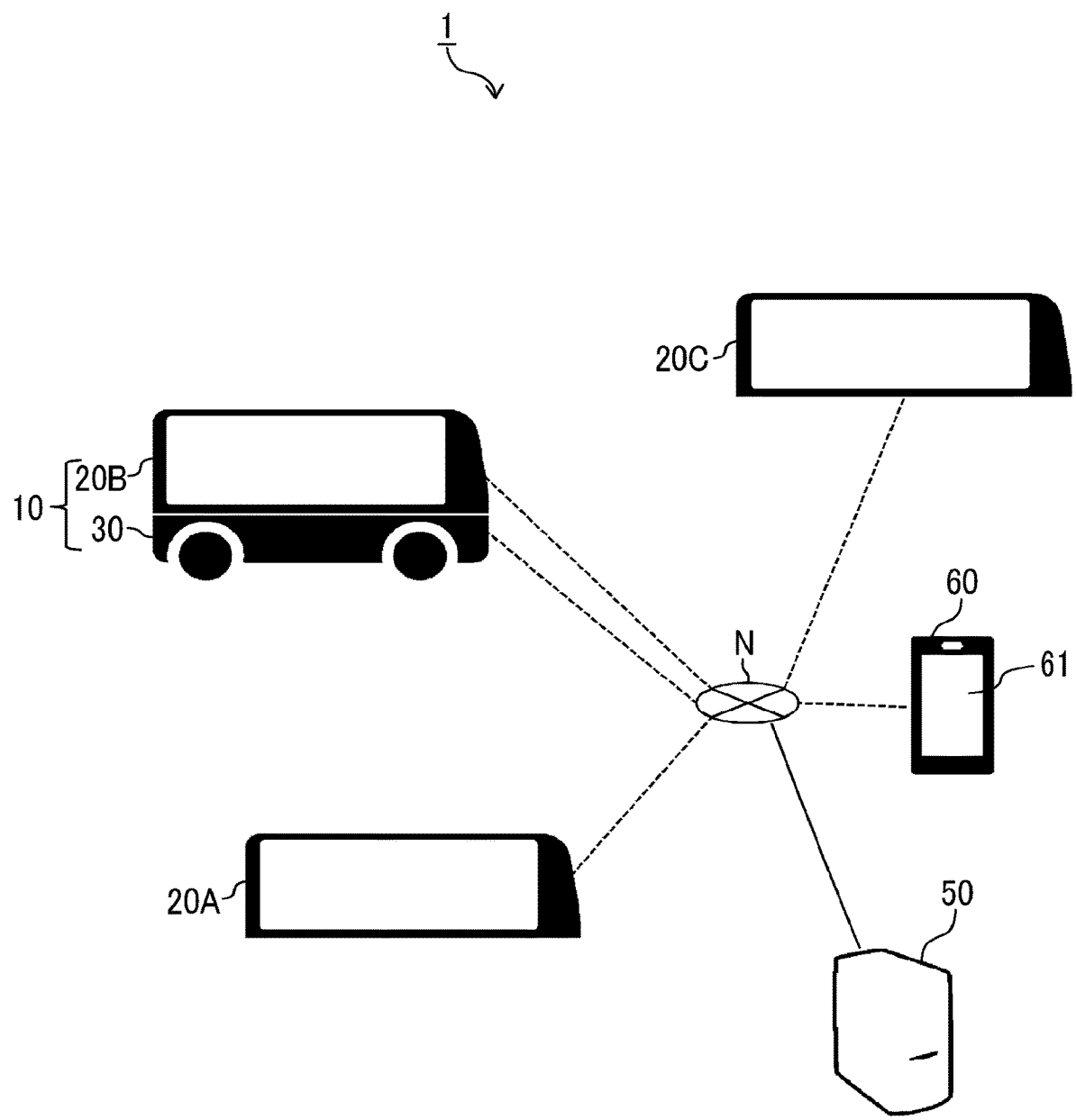
FIG. 1 shows an example of an outline of a configuration of an information collection system according to a first embodiment.

An information processing device according to a first aspect of the present disclosure supports advertisement activity using a vehicle. The vehicle according to the first aspect includes a first unit having a drive unit and a second unit that is usable as a vehicle cabin of the vehicle. The second unit is disposed in a predetermined position and provided for advertisement activity. The second unit may be disposed separately from the first unit. The number of first units and the number of second units may not match.

The first unit collects, for example, a user reaction to a free sample to be provided together with the provision of the free sample. The collection of the user reaction is performed, for example, by receiving an input of an answer to a questionnaire or by analyzing an image of a facial expression and a body motion (gesture or the like) of a user who uses the free sample.

The information processing device according to the first aspect of the present disclosure acquires first information related to the advertisement activity from the first unit. Alternatively, the information processing device acquires second information related to a movement of a person within a first predetermined range from a place where the first unit is disposed. The first predetermined range may be, for example, a range of a predetermined distance, or a range of a predetermined distance from a device that communicates with a communication device mounted on the first unit, such as a base station of a mobile phone or a base station of a wireless local area network (LAN). The information processing device according to the first aspect of the present disclosure issues an instruction to move the second unit based on the acquired first information or the acquired second information.

The second unit to be provided for the advertisement activity in the information processing device according to the first aspect of the present disclosure urges the use of a target to be advertised by using a device included in the second unit or is provided as a personal space in a case where the user uses the target to be advertised. The first information includes user attribute information in addition to the reaction of the user who uses the free sample described above. The acquiring the second information within the first predetermined range from a place where the second unit is disposed includes identifying a person from an image captured by a camera installed within the first predetermined range from each disposition place of the second unit, acquiring information generated from a device carried by the person from a network to which the device is connected, or acquiring information on an event held within the first predetermined range from the disposition place of the second unit through the network. The first predetermined range includes a region targeted for the advertisement by an advertiser.

According to the present disclosure, it is possible to collect the first information related to the advertisement activity on the spot where the advertisement activity is performed. Therefore, the efficiency of collecting the information related to the advertisement activity is improved. According to the present disclosure, the disposition place of the second unit is changed to a place expected to attract customers based on the first information related to the advertisement activity or the second information related to the movement of the person, and thus it is possible to increase the number of collections. It is also possible to move the first unit, which is connected to the second unit while the user uses the free sample in an internal space and is not driven, to a place expected to attract customers in connection with another second unit. That is, according to the present disclosure, it is possible to improve the efficiency of collecting the information related to the advertisement activity by using the first unit that is not driven.

First Embodiment

System Configuration

FIG. 1 shows an example of an outline of a configuration of an information collection system 1 according to a first embodiment. The information collection system 1 according to the present embodiment includes, for example, a plurality of vehicle cabin units (20A, 20B, 20C), one traveling unit 30, an information processing device 50, and an information terminal 60. Note that a plurality of traveling units 30 may be provided for the vehicle cabin units (20A, 20B, 20C). Each of the vehicle cabin units (20A, 20B, 20C) and the traveling unit 30 are separable and connectable, and a vehicle 10 is formed in a case where both units are connected. The traveling unit 30 is an example of the "first unit" in the present disclosure. The vehicle cabin units (20A, 20B, 20C) are examples of the "second unit" in the present disclosure.

The advertisement is displayed in a space inside the vehicle cabin unit 20. The user can use the free sample of a product or service described in the advertisement. The advertisement exhibited in each of the vehicle cabin units (20A, 20B, 20C) may be different, or at least a part of the exhibited advertisement may be the same. The user attribute information and impression information that the user uses the free sample are transmitted from each of the vehicle cabin units (20A, 20B, 20C) to the information processing device 50 through the information terminal 60.

In the information processing device 50, the user attribute information and the impression information using the free sample are collected from each of the vehicle cabin units (20A, 20B, 20C) and statistical processing is performed. The information processing device 50 performs processing of efficiently collecting the user attribute information and the impression information using the free sample. More specifically, in the information processing device 50, for example, a disposition place of each of the vehicle cabin units (20A, 20B, 20C) is selected such that more user attribute information and impression information using the free sample are collected, and processing of issuing the movement instruction is executed. In the information processing device 50, a coupon is distributed to the information terminal 60 near the vehicle cabin unit to guide the user to each of the vehicle cabin units (20A, 20B, 20C).

The information terminal 60 is carried by the user, for example, and provides the user with various functions. Therefore, the information terminal 60 includes a touch panel display 61, for example. The touch panel display 61 displays the coupon transmitted from the information processing device 50.

In the information collection system 1 according to the first embodiment, an input device 21 (described below) provided in the vehicle cabin unit 20, the traveling unit 30, the information processing device 50, and the information terminal 60 are mutually connected by a network (N). For example, a wide area network (WAN), which is a worldwide public communication network such as the Internet, or another communication network may be employed as the network. The network may include a telephone communication network such as a mobile phone and a wireless communication network such as WiFi (registered trademark).

Hardware Configuration of Each Device Hardware Configuration of Vehicle Cabin Unit 20

The vehicle cabin unit 20 is vertically separable and connectable with the traveling unit 30 described below. More specifically, the vehicle cabin unit 20 and the traveling unit 30 described below may be respectively provided with, for example, a mechanism that is separable and connectable to achieve the separation and the connection. The vehicle cabin unit 20 and the traveling unit 30 may be separated and connected by using the magnetic force of an electromagnet, for example.

The vehicle cabin unit 20 also includes the input device 21 having a touch panel display 22. The input device 21 includes a central processing unit (CPU), a memory, an external storage device, and a communication module in addition to the touch panel display 22. The communication module is a module capable of performing wireless communication by a wireless signal and a wireless communication method according to a predetermined wireless communication standard. The memory stores a computer program executed by the CPU, data processed by the CPU, and the like. Examples of the memory include a dynamic random access memory (DRAM), a static random access memory (SRAM), and a read-only memory (ROM). An example of the external storage device includes a solid state drive (SSD) or a non-volatile storage device such as a hard disk drive. The input device 21 includes a Global Positioning System (GPS) module. The GPS module receives radio waves of point-in-time signals from a plurality of artificial satellites that orbits the earth and outputs information related to a current position using the radio wave information.

Hardware Configuration of Traveling Unit 30

Figure 2:
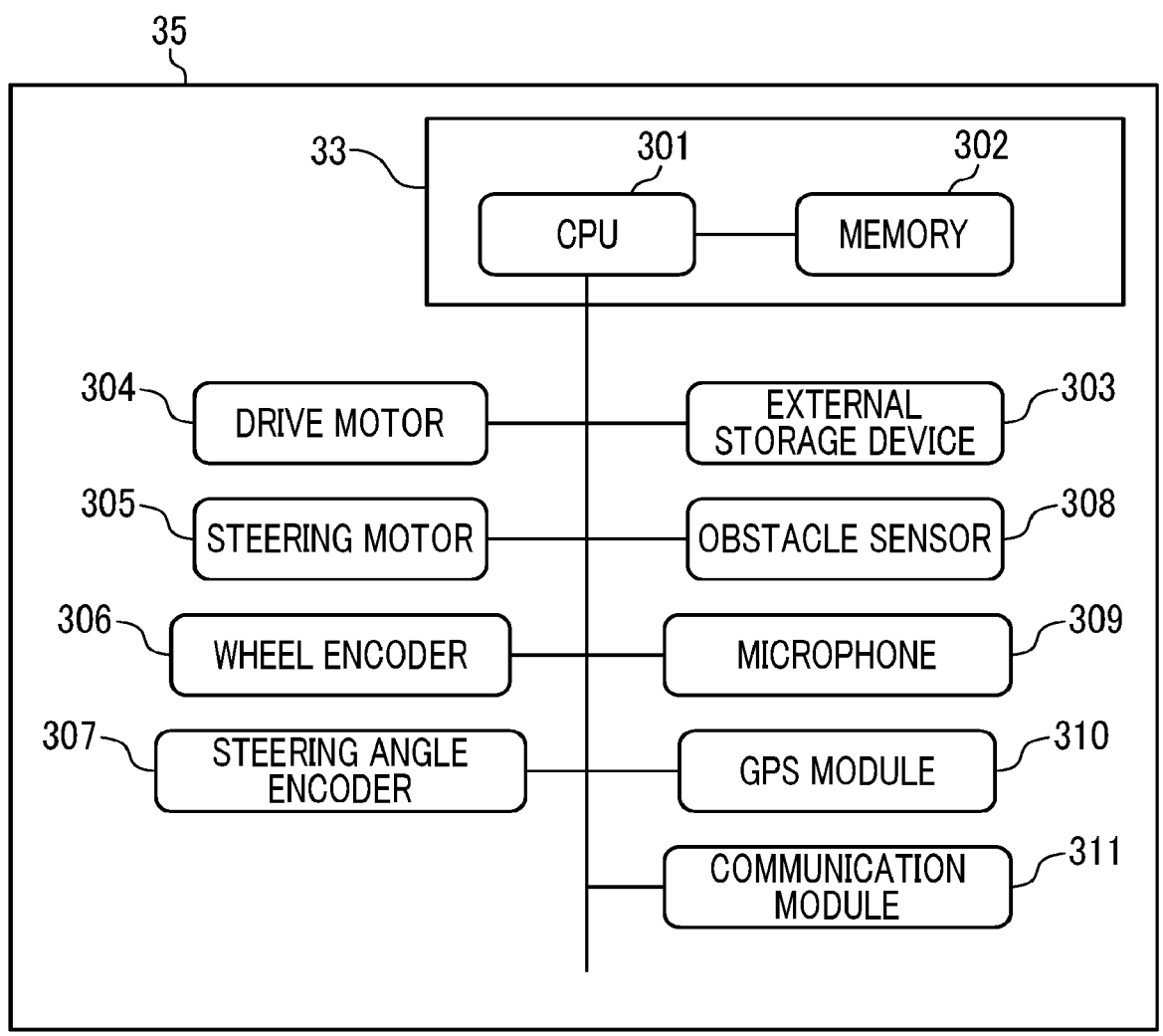
FIG. 2 shows an example of an outline of a hardware configuration of a control device.

The traveling unit 30 is capable of autonomous traveling and can move the connected vehicle cabin unit 20 to a predetermined point. The traveling unit 30 can be shared among the vehicle cabin units (20A, 20B, 20C). The traveling unit 30 includes a control device 35. FIG. 2 shows an outline of a hardware configuration of the control device 35. As shown in FIG. 2, the control device 35 includes an electronic control unit 33 (ECU) having a CPU 301 and a memory 302, and an external storage device 303. The traveling unit 30 also includes a drive motor 304, a steering motor 305, a wheel encoder 306, and a steering angle encoder 307.

The traveling unit 30 has two pairs of wheels in a front-rear direction, and the drive motor 304 rotates the wheels. Note that the drive motor 304 may drive any one pair of two pairs of front and rear wheels. The steering motor 305 outputs power for changing a direction along a rotation shaft of at least one pair of wheels to steer the vehicle 10. The wheel encoder 306 outputs a wheel rotation angle at a predetermined detection time interval. The steering angle encoder 307 detects a steering angle at a predetermined detection time interval.

The control device 35 includes an environment sensor such as an obstacle sensor 308 and a microphone 309 that can detect the environment around the traveling unit 30. The obstacle sensor 308 includes an ultrasonic sensor or a radar. The obstacle sensor 308 emits an ultrasonic wave, an electromagnetic wave, or the like in a detection target direction, and detects presence, position, relative speed, and the like of an obstacle in the detection target direction by using a difference between the emitted wave and the received reflected wave. Examples of the obstacles include a pedestrian, a bicycle, a structure, and a building. An installation position of the obstacle sensor 308 may be, for example, near four corners in the front, rear, right, and left of the traveling unit 30 with an advancing direction of the traveling unit 30 as a front direction. The microphone 309 converts a sound emitted around the traveling unit 30 into an electric signal.

The control device 35 includes a Global Positioning System (GPS) module 310 and a communication module 311. The GPS module receives the radio waves of the point-in-time signals from the artificial satellites that orbit the earth and outputs information related to a current position. The communication module 311 is a module capable of performing wireless communication by a wireless signal and a wireless communication method according to a predetermined wireless communication standard. Hardware Configuration of Information Processing Device 50

The information processing device 50 is a computer having a processor such as a CPU, a main storage device such as a RAM or a ROM, an auxiliary storage device such as an EPROM, a hard disk drive, or a removable medium, and a communication module such as a network interface card (NIC) or a wireless circuit. The removable medium may be, for example, a USB memory or a disk recording medium such as a CD or a DVD. The auxiliary storage device stores an operating system (OS), various programs, information in various table formats, and the like. The programs stored therein are loaded into a work area of the main storage device and executed to control components and the like, and thus it is possible to realize each function that matches a predetermined purpose as described below.

Hardware Configuration of Information Terminal 60

The information terminal 60 is a computer having a processor such as a CPU, a main storage device such as a RAM or a ROM, an auxiliary storage device such as an EPROM or a hard disk drive, a GPS module, and a communication module, in addition to the touch panel display 61 described above. The auxiliary storage device stores an operating system (OS), various programs, information in various table formats, and the like. The programs stored therein are loaded into a work area of the main storage device and executed to control components and the like, and thus it is possible to realize each function that matches a predetermined purpose as described below.

Functional Configuration of Each Device

Figure 3:
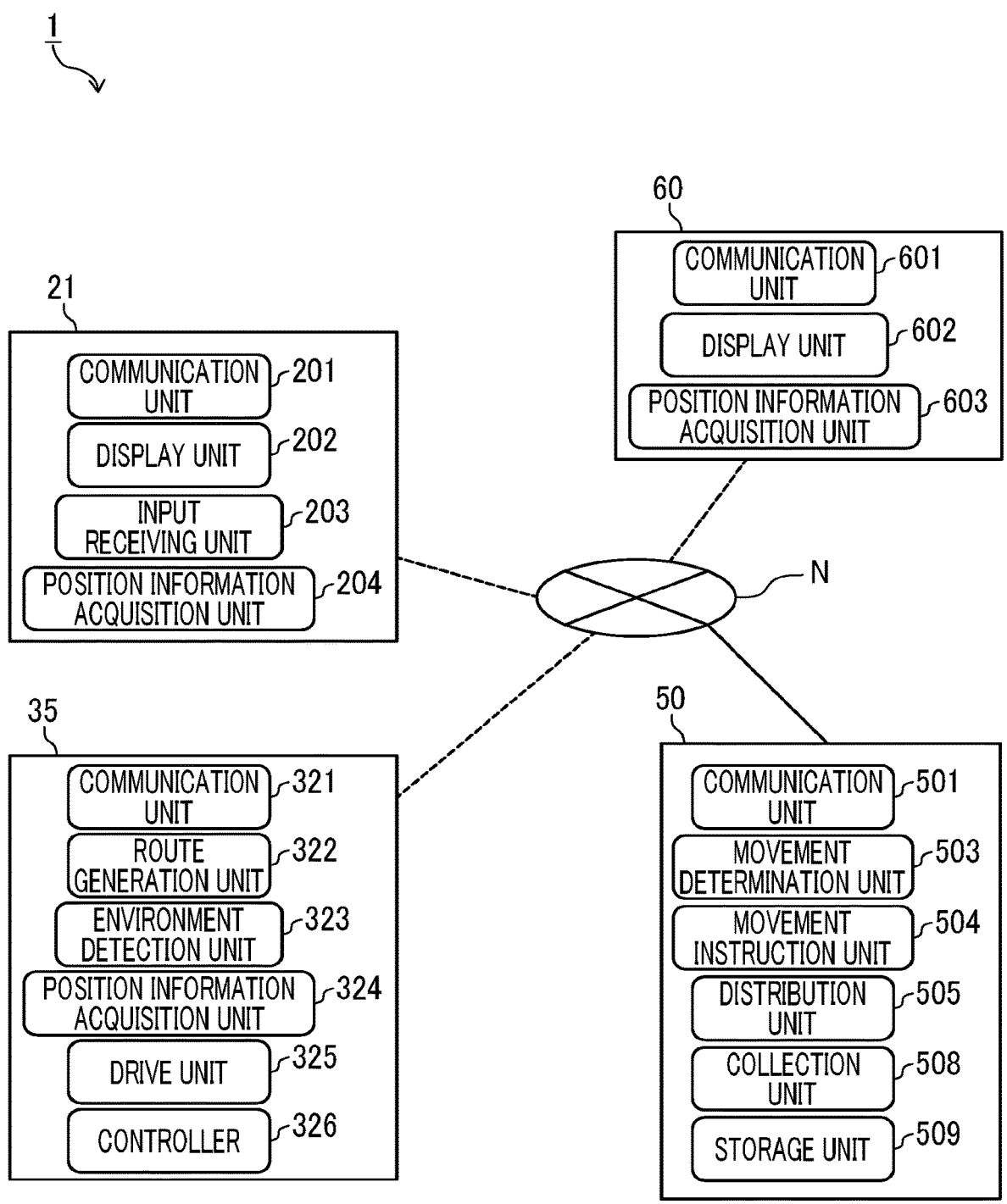
FIG. 3 shows an example of an outline of a functional configuration of each device forming the information collection system.

FIG. 3 illustrates an example of an outline of each of functional configurations of the vehicle cabin unit 20, the traveling unit 30, the information processing device 50, and the information terminal 60 that form the information collection system 1.

Vehicle Cabin Unit 20

Each function described below of the input device 21 of the vehicle cabin unit 20 is realized by the CPU executing the computer program developed in the memory in an executable manner.

The input device 21 includes a communication unit 201. The communication unit 201 is formed including a communication module. The communication unit 201 is connected to, for example, a WiFi access point or a base station of a mobile phone and communicates information with various servers on the network through a WAN to be connected to the point or the station.

The input device 21 also includes a display unit 202. The display unit 202 is formed including the touch panel display 22. The display unit 202 displays information on the touch panel display 22.

The input device 21 includes an input receiving unit 203. The input receiving unit 203 is formed including the touch panel display 22. Note that the input receiving unit 203 may be considered to include a controller of the touch panel display 22 without including the touch panel display 22 itself. The input receiving unit 203 determines whether or not information is input through the touch panel display 22. The input receiving unit 203 receives the input information in a case where the information is determined to be input through the touch panel display 22.

The input device 21 includes a position information acquisition unit 204. The position information acquisition unit 204 is formed including a GPS module. The position information acquisition unit 204 acquires information on the current point of the vehicle cabin unit 20 from the output of the GPS module.

Traveling Unit 30

Each function described below in the control device 35 of the traveling unit 30 is realized by the CPU 301 executing the computer program developed in the memory 302 included in the ECU 33 in an executable manner. The control device 35 includes a communication unit 321. The communication unit 321 is formed including the communication module 311. The communication unit 321 is connected to, for example, a WiFi access point or a base station of a mobile phone and further communicates information with various servers on the network through a WAN to be connected to the point or the station.

The control device 35 also includes a route generation unit 322. The route generation unit 322 generates a route from a current point to a target point. A method of the route may be a known method or a method using a unique algorithm. The route is formed as a sequence of a series of target trajectories including latitude and longitude.

The control device 35 also includes an environment detection unit 323. The environment detection unit 323 is formed including the obstacle sensor 308 and the microphone 309. The environment detection unit 323 detects the environment around the traveling vehicle 10 while the vehicle travels. More specifically, the environment detection unit 323 determines whether or not there is an obstacle around the vehicle 10 based on an output from the obstacle sensor 308 and outputs the determination information. The environment detection unit 323 determines whether or not an output from the microphone 309 is equal to or larger than a predetermined threshold value and is a voice of a person. The environment detection unit 323 determines that there is a person around the vehicle 10 in a case where the output from the microphone 309 is determined to be equal to or larger than the threshold value and is determined to be the voice of the person. The environment detection unit 323 outputs the determination information. Analysis of a frequency spectrum of a signal output from the microphone 309, voice recognition, or the like is performed to determine whether or not the output is the voice of the person.

The control device 35 includes a position information acquisition unit 324. The position information acquisition unit 324 is formed including a GPS module 310. The position information acquisition unit 324 acquires information on a current point of the traveling unit 30 from an output of the GPS module 310.

The control device 35 includes a drive unit 325. The drive unit 325 is formed including the drive motor 304, the steering motor 305, the wheel encoder 306, and the steering angle encoder 307. The drive unit 325 controls the drive motor 304 and the steering motor 305 in accordance with a control signal to drive the drive motor 304 and the steering motor 305. The drive unit 325 outputs a steering angle of the vehicle 10 at a predetermined detection time interval by the steering angle encoder 307. The drive unit 325 outputs a wheel rotation angle at a predetermined detection time interval through the wheel encoder 306.

The control device 35 also includes a controller 326. The controller 326 is formed including the ECU 33. The controller 326 generates a control signal to drive the drive motor 304 and the steering motor 305. The control signal generated by the controller 326 includes a signal such that the traveling unit 30 follows the target trajectory. The controller 326 acquires the steering angle information of the traveling unit 30 and the wheel rotation angle information from the drive unit 325. The controller 326 modifies the control signal such that the traveling unit 30 follows the target trajectory according to the acquired steering angle information and wheel rotation angle information. The controller 326 receives the information on the current point of the traveling unit 30 from the position information acquisition unit 324. The control signal is modified such that the traveling unit 30 follows the target trajectory according to the received information on the current point. The controller 326 receives the environment information around the traveling unit 30 from the environment detection unit 323. The controller 326 modifies the control signal according to the received environment information. The controller 326 performs control for separating or connecting the traveling unit 30 and the vehicle cabin unit 20.

Information Processing Device 50

Each function described below in the information processing device 50 is realized by the CPU executing the computer program developed in the memory in an executable manner.

The information processing device 50 includes a communication unit 501. The communication unit 501 is formed including a communication module. The communication unit 501 is connected to, for example, a local area network (LAN), further connected to a WAN through the LAN, and communicates with various servers or information terminals on the network through the WAN.

The information processing device 50 includes a movement determination unit 503. The movement determination unit 503 determines whether or not to move each of the vehicle cabin units (20A, 20B, 20C) from the current disposition place to collect more user impression information and attribute information. For example, the impression information or the attribute information input by the user to the input device 21 in the vehicle cabin unit 20 is used as the determination reference. Alternatively, for example, the position information of the information terminal 60 owned by the user is used as the determination reference.

The information processing device 50 includes a movement instruction unit 504. The movement instruction unit 504 generates a movement instruction signal to instruct the traveling unit 30 to move. The movement instruction unit 504 determines whether or not a vehicle cabin unit 20 to be moved is connected with the traveling unit 30 in a case where the movement instruction signal is generated. In a case where the vehicle cabin unit 20 to be moved is determined to be not connected to the traveling unit 30, the movement instruction unit 504 generates a movement instruction signal to instruct the traveling unit 30 in another place to be separated from a connected vehicle cabin unit 20, connected with the vehicle cabin unit 20 to be moved, and then moved toward the target point. The determination as to whether or not the vehicle cabin unit 20 to be moved and the traveling unit 30 are connected is realized by the movement instruction unit 504 referring to assignment information (stored in a storage unit 509 described below) indicating that the traveling unit 30 is assigned to one of the vehicle cabin units 20 in advance.

The information processing device 50 includes a distribution unit 505. The distribution unit 505 uses the position information of the information terminal 60 to determine whether or not there is an information terminal 60 within a walking distance (an example of a "second predetermined range" in the present disclosure) from the disposition place of the vehicle cabin unit 20. In a case where the information terminal 60 is determined to be present, the distribution unit 505 refers to an advertisement (stored in the storage unit 509 described below) displayed in the vehicle cabin unit 20. The distribution unit 505 specifies the coupon related to the product or service described in the advertisement exhibited in the vehicle cabin unit 20. The distribution unit 505 distributes information including the specified coupon and the disposition place information of the vehicle cabin unit 20 as coupon information to the information terminal 60 within the walking distance from the vehicle cabin unit 20.

The information processing device 50 includes a collection unit 508. The collection unit 508 acquires the impression information on the free sample in the vehicle cabin unit 20 and the user attribute information. The collection unit 508 executes, for example, statistical analysis processing (hereinafter also simply referred to as statistical processing) to calculate an average value, a median value, a most frequent value, and the like of the attribute information. The collection unit 508 acquires statistical information of the impression information and the attribute information for each free sample in a case where different free samples are provided in the respective vehicle cabin units 20 (20A, 20B, 20C). The collection unit 508 may analyze the obtained statistical information by a known method. The collection unit 508 may also use a distributed computing technique to speed up the statistical analysis.

The information processing device 50 includes the storage unit 509. The storage unit 509 is formed including a main storage device and an auxiliary storage device. The storage unit 509 stores information (including information shown in a table format) using the main storage device or the auxiliary storage device. The information stored in the storage unit 509 includes, for example, the assignment information indicating whether or not the traveling unit 30 is assigned to any of the vehicle cabin units (20A, 20B, 20C). The information stored in the storage unit 509 includes, for example, the disposition information of each of the vehicle cabin units (20A, 20B, 20C) and the advertisement information exhibited in each of the vehicle cabin units (20A, 20B, 20C).

Information Terminal 60

Each function described below in the information terminal 60 is realized by the CPU executing the computer program developed in the memory in an executable manner.

The information terminal 60 includes a communication unit 601. The communication unit 601 is formed including a communication module. The communication unit 601 is connected to, for example, a WiFi access point or a base station of a mobile phone and further communicates information with various servers on the network through a WAN to be connected to the point or the station.

The information terminal 60 includes a display unit 602. The display unit 602 is formed including the touch panel display 61. The display unit 602 displays information on the touch panel display 61.

The information terminal 60 includes a position information acquisition unit 603. The position information acquisition unit 603 is formed including a GPS module. The position information acquisition unit 603 acquires information on a current point of the information terminal 60 from an output of the GPS module.

Processing Flow of Information Collection in Information Processing Device 50

Figure 4:
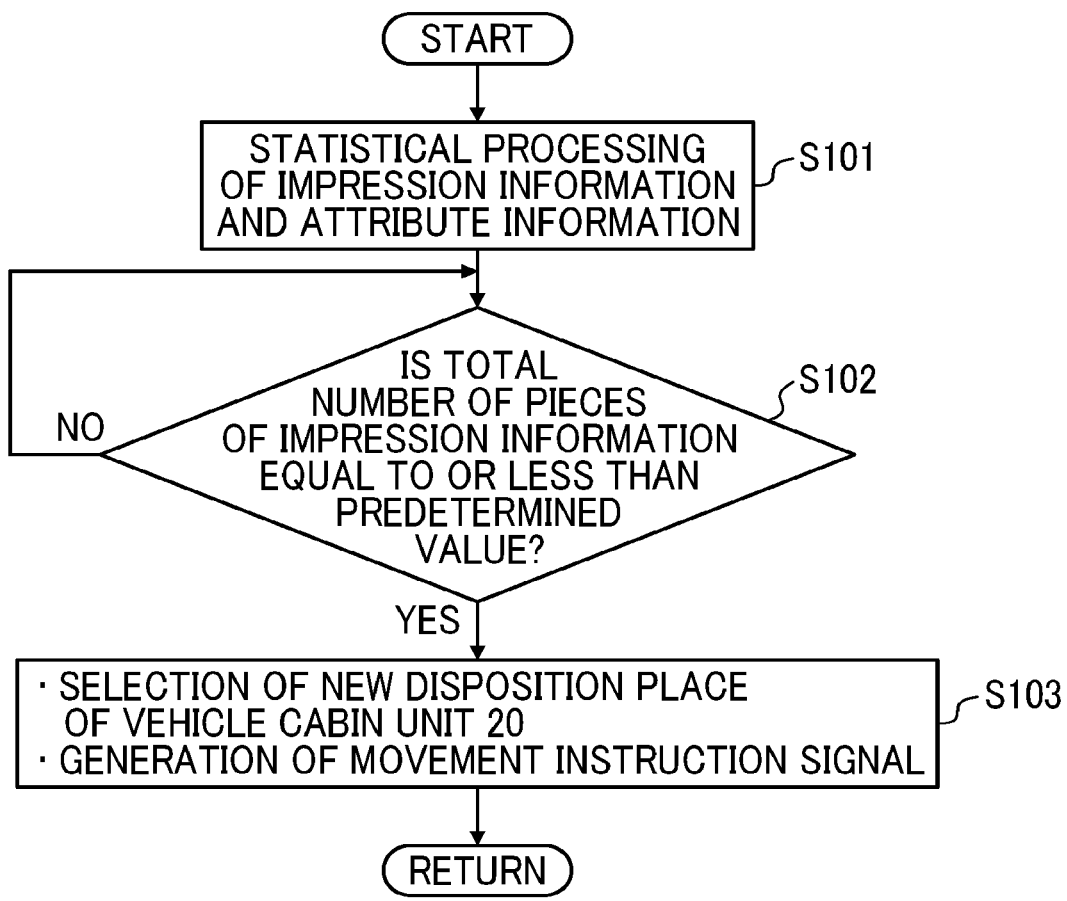
FIG. 4 shows an example of a flowchart of information collection executed by an information processing device.

Next, a processing flow of information collection executed in the information processing device 50 will be described. FIG. 4 shows an example of a flowchart of the information collection executed by the information processing device 50.

S101

In step S101, the collection unit 508 executes the statistical processing of the impression information on the free sample input from the touch panel display 22 of the vehicle cabin unit 20A and the user attribute information. For example, the total number of pieces of impression information and the total number of users who input the impression information are calculated by the statistical processing. A distribution tendency of the user attribute information is acquired by the statistical processing. Examples of the distribution tendency of the user attribute information include a gender ratio, a distribution of the number of users according to age, the number of users according to hobbies, and a distribution of the number of users for each target of user interest. The targets of user interest are categorized by various keywords. Examples of the target include sports, drama, health, beauty, body type, clothing, and jewelry.

S102

In step S102, the movement determination unit 503 determines whether or not the total number of pieces of impression information statistically processed in step S101 is equal to or less than a predetermined reference value.

S103

In step S103, in a case where the movement determination unit 503 determines that the total number of pieces of impression information is equal to or less than the predetermined reference value in step S102, the movement instruction unit 504 selects a new disposition place of the vehicle cabin unit 20A. The new disposition place is set, for example, near a disposition place of the vehicle cabin unit 20 having a large total number of pieces of impression information among the other vehicle cabin units (20B, 20C) having statistics obtained in step S102. The movement instruction unit 504 generates a movement instruction signal including information on the selected new disposition place.

Alternatively, in step S102, the movement determination unit 503 may determine whether or not the distribution tendency of the user attribute information in the vehicle cabin unit 20A (acquired in step S101) matches the target of the advertisement exhibited in the vehicle cabin unit 20A. In a case where the distribution tendency of the user attribute information is determined not to match the target of the advertisement, the movement instruction unit 504 selects a new disposition place of the vehicle cabin unit 20A. In the selection of the new disposition place, in a case where there is a vehicle cabin unit that matches the target of the advertisement exhibited in the vehicle cabin unit 20A among the distribution tendency of the user attribute information of the other vehicle cabin units (20B, 20C) acquired in step S101, a new disposition place of the vehicle cabin unit 20A is selected near the vehicle cabin unit. Alternatively, the movement instruction unit 504 acquires, from a plurality of information terminals 60 through the communication unit 501, connection history information (an example of "information generated from a device carried by a person" in the present disclosure) to a WiFi access point of the information terminals 60 of a plurality of users. The WiFi access point may be, for example, a plurality of WiFi access points that provides a communicable area adjacent to a communicable area that covers the current position of the vehicle cabin unit 20A. A new disposition place of the vehicle cabin unit 20A is selected near a WiFi access point with a large number of connections from the information terminal 60 among the WiFi access points.

Alternatively, the information processing device 50 may include a circulation unit 510 in addition to the above functions. The circulation unit 510 circulates sites connected to the network and acquires event information. Examples of the event information to be acquired include a date and time when the event is held, a place, and an accommodation capacity of a venue. In step S103, the movement instruction unit 504 determines whether or not the acquired information on the date and time when the event is held, the place, and the accommodation capacity of the venue matches the target of the advertisement exhibited in the vehicle cabin unit 20A. In a case where the information is determined to match the target thereof, the movement instruction unit 504 may select the event venue as a new disposition place of the vehicle cabin unit 20A. Alternatively, in a case where the acquired place where the event is held is within a target region (an example of the "first predetermined range" in the present disclosure) of the advertisement exhibited in the vehicle cabin unit 20A, the movement instruction unit 504 may select the place where the event is held as a new disposition place of the vehicle cabin unit 20A. In a case where the acquired place where the event is held is within a target region of the advertisement exhibited in a vehicle cabin unit other than the vehicle cabin unit 20A, the movement instruction unit 504 may select the place where the event is held as a new disposition place of the vehicle cabin unit other than the vehicle cabin unit 20A.

Processing Flow of Information Collection System 1

Figure 5:
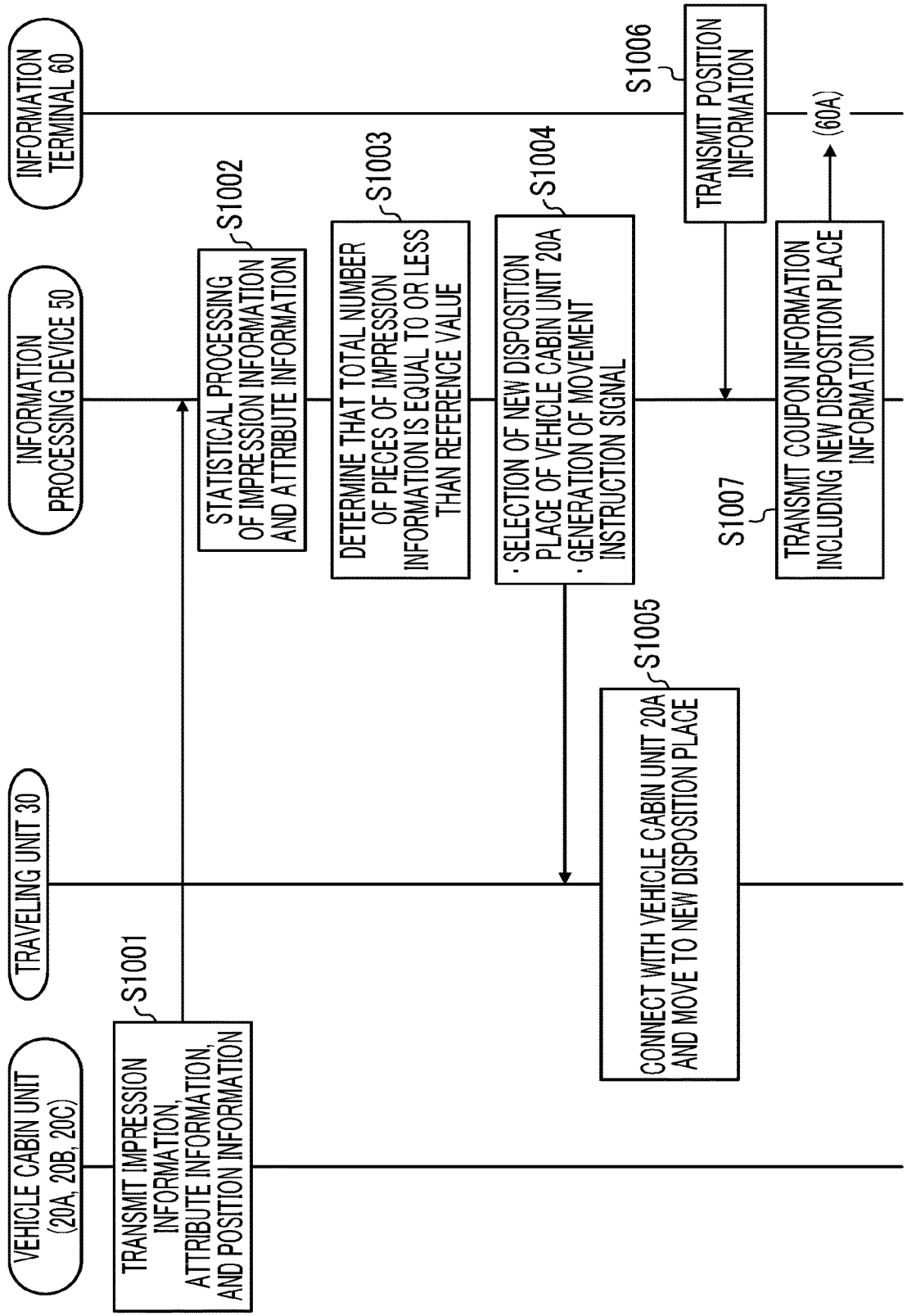
FIG. 5 shows an example of a flowchart of processing executed by the entire information collection system.

Next, an example of processing realized by the entire information collection system 1 will be described. FIG. 5 shows an example of a flowchart of the processing executed by the entire information collection system 1.

S1001

In step S1001, the input receiving unit 203 of the input device 21 provided in each of the vehicle cabin units (20A, 20B, 20C) receives the inputs of the impression information of the user who uses the free sample and the attribute information of the user who uses the free sample. The input impression information on the free sample and user attribute information are transmitted to the communication unit 501 of the information processing device 50 by the communication unit 201. The position information acquisition unit 204 of each of the vehicle cabin units (20A, 20B, 20C) acquires the position information. The acquired position information is also transmitted to the communication unit 501 by the communication unit 201.

S1002

In step S1002, the communication unit 501 of the information processing device 50 receives the impression information on the free sample and the user attribute information from the communication unit 201 of the input device 21. The collection unit 508 executes the statistical processing on the received impression information on the free sample and user attribute information to acquire the statistical information. The impression information on the free sample and the user attribute information are received from each of the communication units 201 of the vehicle cabin units (20A, 20B, 20C). The communication unit 501 receives the position information of the vehicle cabin units (20A, 20B, 20C) from the communication unit 201. The impression information on the free sample and the user attribute information are examples of the "first information related to the advertisement activity" in the present disclosure. The impression information on the free sample is also an example of the "user reaction" in the present disclosure.

S1003

In step S1003, the movement determination unit 503 determines whether or not the total number of pieces of impression information transmitted from the communication unit 201 of each of the vehicle cabin units (20A, 20B, 20C) exceeds a predetermined reference value for each of the vehicle cabin units. The movement determination unit 503 is assumed to determine that the total number of pieces of impression information transmitted from the vehicle cabin unit 20A does not exceed the predetermined reference value.

S1004

In step S104, the movement instruction unit 504 selects a new disposition place of the vehicle cabin unit 20A. The movement instruction unit 504 generates a movement instruction signal including information on the selected new disposition place for the vehicle cabin unit 20A.

The movement instruction unit 504 determines whether or not the vehicle cabin unit 20A and the traveling unit 30 are connected. At the time of the determination, the assignment information (stored in the storage unit 509) indicating whether or not the traveling unit 30 is assigned to any of the vehicle cabin units 20 is referred to. The traveling unit 30 is assumed not to connect with the vehicle cabin unit 20A but is connected with the vehicle cabin unit 20B. The total number of pieces of impression information obtained from the vehicle cabin unit 20B is assumed to significantly exceed a predetermined reference value, and many users are assumed to frequently use another free sample in the vehicle cabin unit 20B. In such a case, the movement instruction unit 504 generates a movement instruction signal so as to include a signal to instruct the traveling unit 30 to be separated from the vehicle cabin unit 20B, connected to the vehicle cabin unit 20A, and then moved toward the new disposition place. In a case where the movement instruction signal is generated, the position information of the vehicle cabin units (20A, 20B, 20C) stored in the storage unit 509 is used. The generated movement instruction signal is transmitted to the communication unit 321 of the traveling unit 30 by the communication unit 501. The storage unit 509 updates the information that the traveling unit 30 is assigned to the vehicle cabin unit 20B to the information that traveling unit 30 is assigned to the vehicle cabin unit 20A.

S1005

In step S1005, the communication unit 321 of the traveling unit 30 receives the movement instruction signal transmitted from the communication unit 501 of the information processing device 50 in step S1004. In the traveling unit 30, the position information acquisition unit 324 acquires information on the current point. The route generation unit 322 generates a movement route from the current point to the new disposition place with the new disposition place included in the received movement instruction signal as the target point.

The controller 326 uses the generated movement route to generate a drive control signal to drive the wheels. The drive control signal is transmitted to the drive unit 325, and the drive unit 325 drives the drive wheels according to the received drive control signal. Such processing is executed to move the traveling unit 30 from the current point to the target point. The controller 326 performs control, according to the movement instruction signal, of separating the traveling unit 30 and the vehicle cabin unit 20B before the movement is started. The controller 326 performs control, according to the movement instruction signal, of connecting the traveling unit 30 and the vehicle cabin unit 20A during moving to the target point.

The environment detection unit 323 acquires surrounding environment information while the traveling unit 30 moves to the target point. The controller 326 generates a drive control signal according to the environmental information and transmits the signal to the drive unit 325. Such processing is executed to move the traveling unit 30 to the target point while the initially planned movement route is modified according to the environment.

S1006

In step S1006, each position information acquisition unit 603 of the information terminals 60 carried by the users at various places acquires position information from the GPS module. Each communication unit 601 of the information terminals 60 transmits the acquired position information to the communication unit 501 of the information processing device 50.

S1007

In step S1007, the communication unit 501 of the information processing device 50 receives the position information transmitted from each communication unit 601 of the information terminals 60 carried by the users. The distribution unit 505 uses the received position information of the information terminal 60 to specify the information terminal 60 within a walking distance from the point where the vehicle cabin unit 20A is newly disposed as an information terminal 60A to which the coupon is distributed.

The distribution unit 505 refers to the advertisement information displayed in the vehicle cabin unit 20A stored in the storage unit 509 to specify the coupon related to the product or service described in the advertisement. Coupon information including the coupon and information on a new disposition place of the vehicle cabin unit 20A is generated. The communication unit 501 transmits the coupon information to the communication unit 601 of the information terminal 60A that is specified to exist near the vehicle cabin unit 20A.

In the information terminal 60A, the communication unit 601 receives the coupon information transmitted from the communication unit 501 of the information processing device 50. The display unit 602 displays the received coupon information on the touch panel display 61. The coupon information displayed on the touch panel display 61 includes the information on the new disposition place of the vehicle cabin unit 20A. Therefore, the user carrying the information terminal 60A may be guided to the vehicle cabin unit 20A.

In a case where the traveling unit 30 has a display device such as a digital signage, the traveling unit 30 may be separated from the vehicle cabin unit 20A and circulated around the vehicle cabin unit 20A in a state in which the coupon information is displayed on the display device. In a case where such processing is executed, the user may be also guided to the vehicle cabin unit 20A by viewing the coupon information displayed on the display device of the traveling unit 30.

Effect of First Embodiment

In a case where the free sample is distributed to the user on a street or the like, the user takes the free sample home and uses the sample. In such a case, for example, a site in which the user can input the impressions may be prepared in advance to collect the impressions of the user who uses the free sample. However, the input of the impression information on such a site may be complicated for the user who is distributed the free sample. The user who returns home may not use the free sample itself. Therefore, the number of collections of impression information on the free sample may be decreased. However, with the information collection system 1 as described above, the space inside the vehicle cabin unit 20 is used, and thus it is possible to use the free sample on the spot where the advertisement is exhibited. A personal space for using the free sample is provided, and thus the user can calmly use the free sample over time without returning home. Therefore, with the information collection system 1 as described above, the efficiency of collecting the impression of the user who uses the free sample is improved.

With the information collection system 1 as described above, in a case where the total number of the impression information transmitted from the vehicle cabin unit 20A is determined to be equal to or less than the predetermined reference value in step S1003, the disposition place of the vehicle cabin unit 20A is changed to a place where a lot of impression information is collected in step S1004. That is, with the information collection system 1 as described above, the vehicle cabin unit 20 can be strategically disposed at a place expected to attract customers. Therefore, the advertiser can collect the impression of the user who uses the free sample efficiently and without omission. With the information collection system 1 as described above, the coupon is distributed to the information terminal 60A carried by the user near the vehicle cabin unit 20A, and thus the user is guided to the vehicle cabin unit 20A. The above also improves the efficiency of collecting the impression of the user who uses the free sample.

The vehicle cabin unit 20B having a large number of customers among the vehicle cabin units (20A, 20B, 20C) stays at the place where the free sample is provided while the user uses the free sample. With the information collection system 1 as described above, the vehicle cabin unit 20 and the traveling unit 30 are separable and connectable. Therefore, the traveling unit 30 that is connected with the vehicle cabin unit 20B, is stopped at a predetermined place, and is not driven is separated from the vehicle cabin unit 20B, is connected with the vehicle cabin unit 20A to move the vehicle cabin unit 20A to a place expected to attract customers. That is, with the information collection system 1 as described above, one traveling unit 30 is shared between the vehicle cabin units 20. Therefore, it is possible to effectively use the traveling unit 30, which is stopped at the place where the free sample is provided and is not driven, for moving another vehicle cabin unit 20A. From this point as well, it can be said that the efficiency of collecting the information related to the advertisement activity is improved.

Modification Example

The information processing device 50 may select a new disposition place of the vehicle cabin unit 20A without acquiring the impression information and attribute information of the user and without using the impression information and attribute information of the user. That is, in a case where the information processing device 50 includes, for example, the circulation unit 510, the movement instruction unit 504 may select the event venue as a new disposition place of the vehicle cabin unit 20A and move the vehicle cabin unit 20A in a case where the place where the event acquired by the circulation unit 510 is held is within a predetermined distance from the disposition place of the vehicle cabin unit 20A and the accommodation capacity at the event venue is equal to or larger than a predetermined value. The information collection system 1 having such an information processing device 50 also allows the vehicle cabin unit 20 to be strategically disposed at the place expected to attract customers. Therefore, the advertiser can collect the impression of the user who uses the free sample efficiently and without omission.

Second Embodiment

System Configuration

Figure 6:
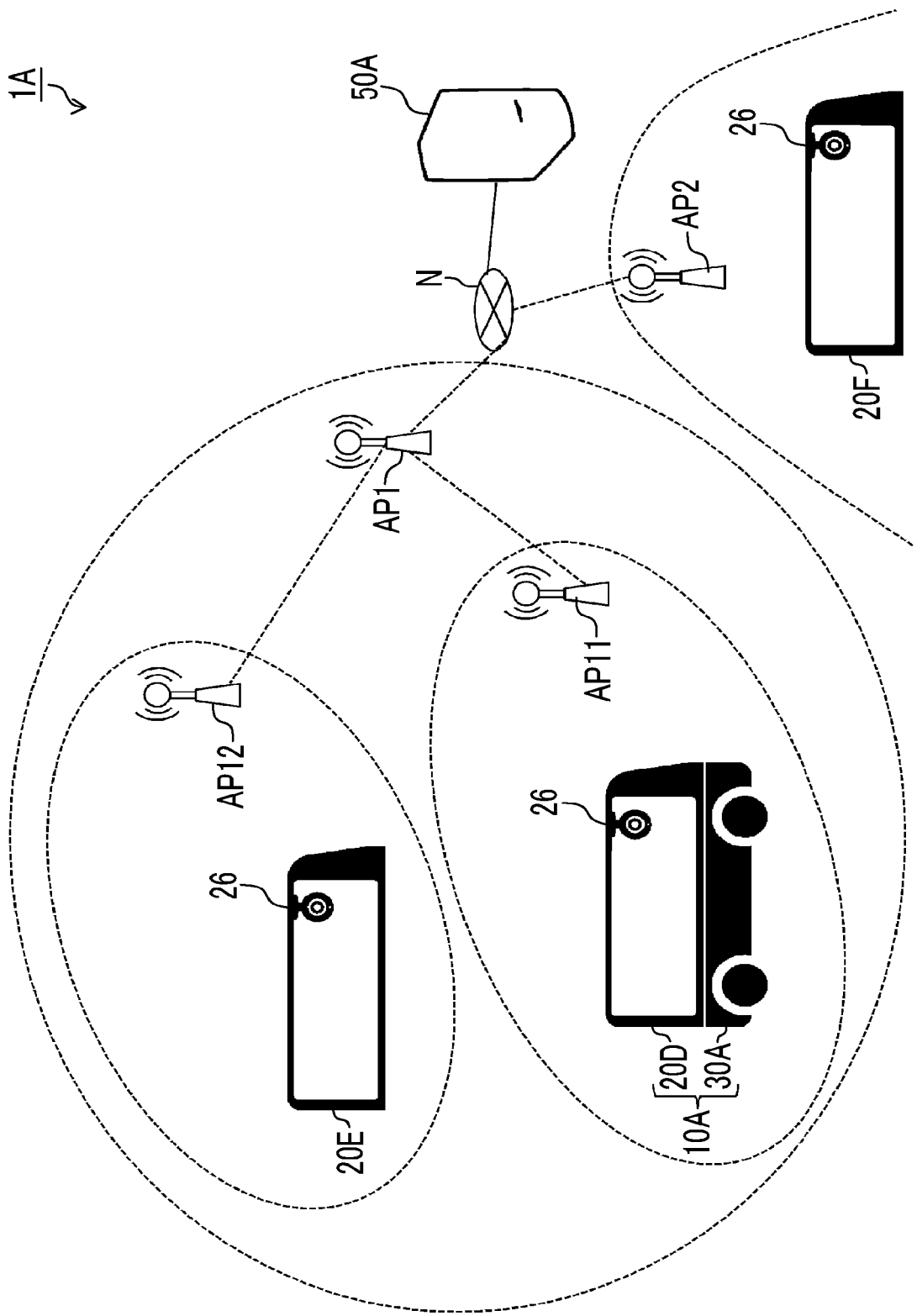
FIG. 6 shows an example of an outline of a configuration of an information collection system according to a second embodiment.

FIG. 6 shows an example of an outline of a configuration of an information collection system 1A according to a second embodiment. The information collection system 1A according to the present embodiment includes, for example, a plurality of vehicle cabin units 20 (20D, 20E, 20F), a traveling unit 30A, and an information processing device 50A.

The vehicle cabin units (20D, 20E, 20F) according to the second embodiment are disposed indoors where positioning by a GPS module is difficult, for example. A user reaction in a case where the free sample is used in an internal space of each of the vehicle cabin unit (20D, 20E, 20F) is imaged by a camera 26 (described below). A captured image of the user reaction is transmitted to the information processing device 50A. Each of the vehicle cabin units (20D, 20E, 20F) may be disposed in the same indoor space or different indoor spaces.

In the information processing device 50A, images showing the user reaction in a case where the free sample is used from respective vehicle cabin units (20D, 20E, 20F) are collected and statistically processed.

The traveling unit 30A executes processing of efficiently collecting the user reaction information. More specifically, the traveling unit 30A moves to a place expected to attract customers using an image showing the scenery outside the vehicle transmitted from the camera 26 of each of the vehicle cabin units (20D, 20E, 20F) in a case where an amount of water stored in a clean water tank 24 installed in the vehicle cabin unit 20D is not reduced.

In the information collection system 1A according to the second embodiment, the camera 26 (described below) provided in each of the vehicle cabin units (20D, 20E, 20F), the traveling unit 30A, and the information processing device 50A are mutually connected by a network (N). For example, a wide area network (WAN), which is a worldwide public communication network such as the Internet, or another communication network may be employed as the network. The network (N) may include a telephone communication network such as a mobile phone and a wireless communication network such as WiFi.

Hardware Configuration of Each Device
Hardware Configuration of Vehicle Cabin Unit 20

An advertisement related to a product that uses water such as detergent or dried food is displayed in an internal space of the vehicle cabin unit 20D of the vehicle cabin units (20D, 20E, 20F). The clean water tank 24 (described below) is installed in the vehicle cabin unit 20D, and the user can use a free sample of the product described in the advertisement using the clean water stored in the clean water tank 24. The vehicle cabin unit 20D and the vehicle cabin unit 20E are disposed in a communicable area of the same WiFi access point AP1. Further, the vehicle cabin unit 20D is disposed in a communicable area of an AP11, which is a child device of the AP1, and the vehicle cabin unit 20E is disposed in a communicable area of an AP12, which is a child device of the AP1. The vehicle cabin unit 20F is disposed in a communicable area of a WiFi access point AP2 different from the AP1.

Figure 7:
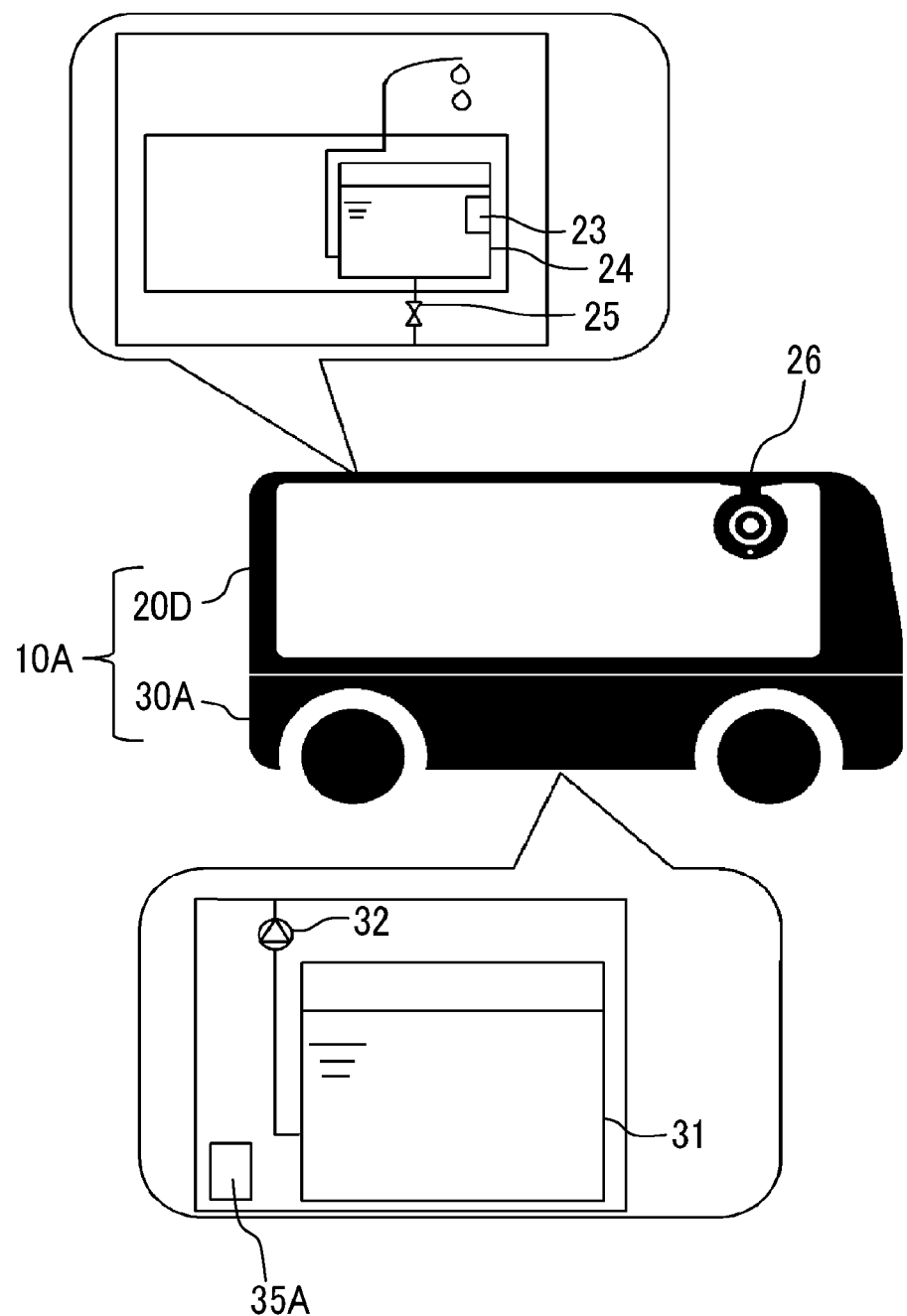
FIG. 7 shows an example of a detailed hardware configuration of a vehicle cabin unit according to the second embodiment.

FIG. 7 shows an example of a detailed hardware configuration of the vehicle cabin unit 20D. As shown in FIG. 7, the vehicle cabin unit 20D includes a sink and the clean water tank 24 that stores the clean water usable in the sink. The clean water (an example of an "object used for advertisement activity" in the present disclosure) stored in the clean water tank 24 is used for use of the free sample such as dishwashing detergent and dried food. A water level gauge 23 for detecting the stored amount of the clean water is provided at a predetermined height inside the clean water tank 24. The water level gauge 23 outputs a water level of the clean water. The water level gauge 23 is capable of wireless communication with an external device, receives a request signal of water level information from the external device, outputs the water level of the clean water, and returns the output of the water level of the clean water to the external device.

The vehicle cabin unit 20D includes a pipe that connects a pipe (described below) provided in the traveling unit 30A and the clean water tank 24 and allows the clean water to flow from the traveling unit 30A side to the clean water tank 24. The vehicle cabin unit 20D includes a valve 25 capable of adjusting an inflow amount of the clean water in the middle of the pipe. The valve 25 can receive an opening-degree control signal from the outside, and an opening degree is controlled according to the received opening-degree control signal.

As shown in FIGS. 6 and 7, the vehicle cabin units (20D, 20E, 20F) include the camera 26. The camera 26 is provided above each of the vehicle cabin units (20D, 20E, 20F). The camera 26 is an imaging device in which an irradiation direction of light irradiated to an imaging target and a condenser lens direction can be changed. That is, the camera 26 can capture scenery of both the inside and outside of the vehicle cabin units (20D, 20E, 20F). The camera 26 has a processor such as a CPU or a digital signal processor (DSP), a main storage device such as a RAM or a ROM, an auxiliary storage device such as an erasable programmable read-only memory (EPROM), a hard disk drive, and a removable medium, and a communication module. The removable medium may be, for example, a Universal Serial Bus (USB) memory or a disk recording medium such as a compact disc (CD) or a digital versatile disc (DVD). The auxiliary storage device stores an operating system (OS), various programs, information in various table formats, and the like. The programs stored therein are loaded into a work area of the main storage device and executed to control components and the like, and thus it is possible to realize each function that matches a predetermined purpose as described below.

Hardware Configuration of Traveling Unit 30A

As shown in FIG. 7, the traveling unit 30A includes a clean water tank 31 in addition to the configuration of the traveling unit 30. The clean water tank 31 stores the clean water (an example of the "object used for advertisement activity" in the present disclosure). When the traveling unit 30A is connected with the vehicle cabin unit 20D, the traveling unit 30A includes a pipe that enables connection of the clean water tank 31 and the pipe provided in the vehicle cabin unit 20D and a pump 32 for sending the clean water in the middle of the pipe. The pump 32 receives an operation control signal to control the operation from an external device, and the operation is controlled according to the received operation control signal. A water sending amount passing through the pipe is adjusted by such an operation of the pump 32. The traveling unit 30A includes a control device 35A as in the traveling unit 30.

Functional Configuration of Each Device

Figure 8:
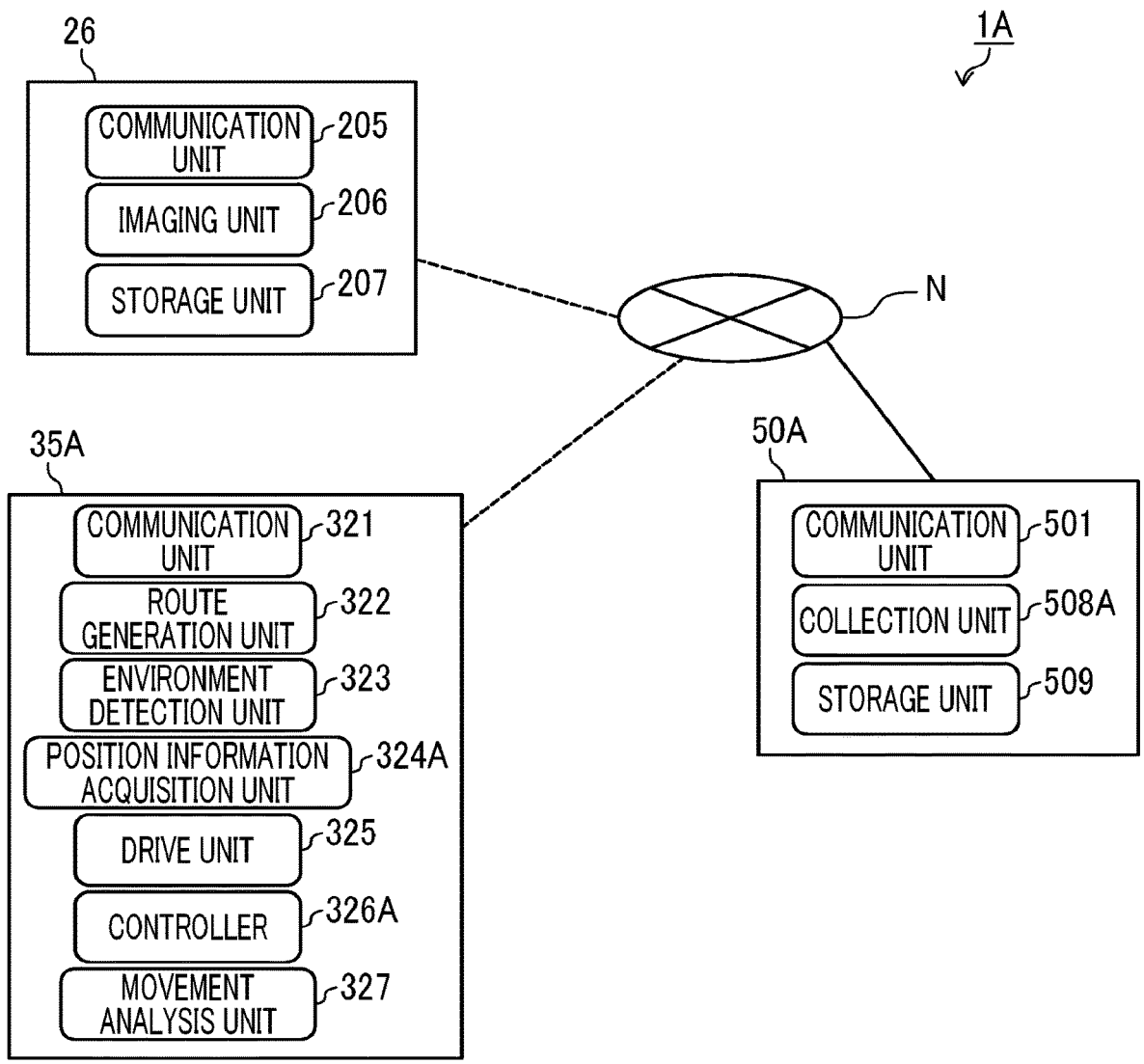
FIG. 8 shows an example of an outline of a functional configuration of each device forming the information collection system according to the second embodiment.

FIG. 8 is an example of an outline of functional configurations of the camera 26 of each of the vehicle cabin units (20D, 20E, 20F), the control device 35A of the traveling unit (30A), and the information processing device 50A that form the information collection system 1A.

Camera 26

Each function described below in the camera 26 of each of the vehicle cabin units (20D, 20E, 20F) is realized by the processor executing the computer program developed in the memory in an executable manner.

The camera 26 includes a communication unit 205. The communication unit 205 is formed including a communication module. The communication unit 205 is connected to, for example, a WiFi access point or a base station of a mobile phone and communicates information with various servers on the network through a WAN to be connected to the point or the station.

The camera 26 also includes an imaging unit 206. The imaging unit 206 can adjust an imaging direction of the camera 26 by controlling the irradiation direction of the light irradiated to the imaging target and the condenser lens direction. The imaging unit 206 can capture an image of the imaging target at constant time intervals. The imaging unit 206 can generate a series of images captured at the constant time intervals.

The camera 26 includes a storage unit 207. The storage unit 207 is formed including a main storage device and an auxiliary storage device. The storage unit 207 stores a captured image captured by the imaging unit 206.

Control Device 35A

A controller 326A of the control device 35A of the traveling unit 30A controls the operations of the pump 32, the valve 25 of the vehicle cabin unit 20D connected with the traveling unit 30A, and the water level gauge 23. More specifically, the controller 326A transmits an operation control signal to operate the pump 32 to the pump 32 through the communication unit 321. The pump 32 operates according to the received operation control signal. The controller 326A transmits an opening-degree control signal for the valve 25 to the valve 25 through the communication unit 321. An opening degree of the valve 25 is adjusted according to the received opening-degree control signal. The controller 326A transmits the request signal requesting water level data to the water level gauge 23 through the communication unit 321. The water level gauge 23 measures the water level according to the received request signal. The measured water level information is returned to the communication unit 321. The controller 326A determines whether or not the water level information is equal to or less than a predetermined value. The controller 326A has the function of the controller 326 according to the first embodiment.

The control device 35A also includes a movement analysis unit 327. The movement analysis unit 327 identifies a person from an object shown in the image. In a case where the person can be identified from the object shown in the image, the movement analysis unit 327 further identifies a hand and a foot of the person and analyzes the hand and foot orientations. A movement direction of the identified person is specified from the identified hand and foot orientations. An identification method may be a known method or a method according to a unique algorithm. The movement analysis unit 327 specifies the movement direction of the person over a plurality of images to acquire information on the movement direction of the person. The movement analysis unit 327 selects a new disposition place of the vehicle cabin unit from statistical information on the obtained movement direction of the person.

The control device 35A includes a position information acquisition unit 324A. The position information acquisition unit 324A acquires an IP address assigned to the unit from a WiFi access point to specify the position information of the traveling unit 30A. A relationship between the IP address and installation place information of the WiFi access point is assumed to be stored in the memory 302 in advance, and the position information acquisition unit 324A is assumed to decide a center of a communicable area of the access point as a current position of the traveling unit 30A by referring to the relationship.

The control device 35A of the traveling unit 30A includes the communication unit 321, the route generation unit 322, the environment detection unit 323, and the drive unit 325 included in the control device 35 according to the first embodiment.

Information Processing Device 50A

The information processing device 50A includes a collection unit 508A. The collection unit 508A identifies a person from an object shown in the image. In a case where the person is identified, the collection unit 508A further identifies a face. The collection unit 508A acquires information about a facial expression. The collection unit 508A identifies a gesture of the user shown in the captured image to acquire information about the gesture. An identification method may be a known method or a method according to a unique algorithm. The statistical processing of the facial expression and the gesture executed by the collection unit 508A may be performed by a known method or a method according to an algorithm originally developed. The information processing device 50A includes the communication unit 501 and the storage unit 509 included in the information processing device 50 according to the first embodiment.

Processing Flow of Control Device 35A

Next, a processing flow executed by the control device 35A of the traveling unit 30A will be described. FIG. 9 shows an example of a flowchart of information collection executed by the control device 35A.

S201

In step S201, the controller 326A transmits the request signal requesting the water level data of the clean water tank 24 to the water level gauge 23 through the communication unit 321. The water level gauge 23 measures the water level according to the received request signal. The measured water level is returned to the communication unit 321. The controller 326A determines whether or not the water level in the clean water tank 24 is equal to or less than a predetermined value. The predetermined value is set to, for example, an amount of water that can be used for the free sample solely a few times.

S202

In step S202, in a case where the water level in the clean water tank 24 is determined to be equal to or less than the predetermined value in step S201, the controller 326A generates the operation control signal to operate the pump 32. The communication unit 321 transmits the operation control signal to the pump 32, and the pump 32 operates. An opening-degree control signal to open the valve 25 is also generated by the controller 326A. The generated opening-degree control signal is transmitted to the valve 25 through the communication unit 321 to open the valve 25. The pump 32 and the valve 25 are operated in this manner, and thus the clean water is replenished from the clean water tank 31 installed in the traveling unit 30A to the clean water tank 24 installed in the vehicle cabin unit 20D.

S203

On the other hand, in a case where the water level in the clean water tank 24 is determined to be higher than the predetermined value in step S201, the communication unit 321 requests a captured image showing the scenery outside the vehicle from the communication unit 205 of each of the vehicle cabin units (20D, 20E, 20F) in step S203.

S204

In step S204, the communication unit 321 receives the captured image from the communication unit 205 of each of the vehicle cabin units (20D, 20E, 20F). The communication unit 321 analyzes an IP address of a transmission source attached to the received captured image to determine whether or not the received captured image is transmitted from the vehicle cabin units (20D, 20E) in the communicable area of the WiFi access point AP1 including the traveling unit 30A. Alternatively, in a case where the captured image is requested from the communication unit 205 through the base station of the mobile phone, the communication unit 321 may analyze the IP address of the transmission source attached to the received captured image to determine whether or not the captured image is transmitted from within the same cell of the base station of the mobile phone as the traveling unit 30A.

S205

In step S205, in a case where the communication unit 321 determines in step S204 that the captured image is transmitted from within the communicable area of the AP 1, the movement analysis unit 327 analyzes posture, face orientation, hand and foot orientations, and the like of the person in the captured image to specify the movement direction of the person. In a case where there is a plurality of received captured images, the movement analysis unit 327 acquires information on the movement direction of the person over the captured images. The movement analysis unit 327 specifies a direction in which the largest number of people move in the captured image of each vehicle cabin unit which is the transmission source. The movement analysis unit 327 uses the IP address of the transmission source, which is the information that is attached when the captured image is transmitted, to specify the disposition place of the vehicle cabin unit which is the transmission source. A new disposition place of the vehicle cabin unit 20D is set to an intersection where lines extending in the direction in which the largest number of people move from the disposition places of respective vehicle cabin units intersect each other.

S206

In step S206, the route generation unit 322 generates a movement route from a current point to the new disposition place of the vehicle cabin unit 20D decided in step S205. Information on the current point is acquired by the position information acquisition unit 324. The controller 326A uses the generated movement route to generate a drive control signal to drive the wheels. Then, the drive control signal is transmitted to the drive unit 325, and the drive unit 325 drives the drive wheels according to the received drive control signal. Such processing is executed to move the traveling unit 30A from the current point to the new disposition place. In a case where the movement analysis unit 327 is unable to decide the intersection in step S205, the vehicle cabin unit 20D is assumed to be moved by a predetermined distance in a movement direction of a person specified from the captured image captured by the camera 26 of the vehicle cabin unit 20D to which the traveling unit 30A is currently connected.

Processing Flow of Information Collection System 1A

Next, an example of processing realized by the entire information collection system 1A will be described. FIG. 10 shows an example of a flowchart of the processing executed by the entire information collection system 1A.

S2001

In step S2001, the imaging unit 206 captures an image of the user who uses the free sample of the advertisement in each of the vehicle cabin units (20D, 20E, 20F). The imaging unit 206 controls the imaging direction in an internal space direction in which the user is. The captured image is stored in the storage unit 207. The communication unit 205 transmits the captured image stored in the storage device by the storage unit 207 to the communication unit 501 of the information processing device 50. The transmission of the captured image from the communication unit 205 to the communication unit 501 may be executed in a case where a predetermined amount of captured images is stored in the storage device or may be executed periodically. The image may be captured by the imaging unit 206 and then transmitted in real time to the communication unit 501 of the information processing device 50.

S2002

In step S2002, the communication unit 501 of the information processing device 50A receives the captured image showing the user who uses the free sample from the communication units 205 of each of the vehicle cabin units (20D, 20E, 20F). When the captured image is received, the collection unit 508A identifies the face of the user shown in the captured image. The collection unit 508A acquires information about the facial expression of the user. The facial expressions can be classified into, for example, a positive facial expression, a negative facial expression, and no reaction. The positive facial expression is determined based on a degree of rising of the upper jaw or the size of the eyes. The negative facial expression is determined, for example, based on wrinkles between the eyebrows, a degree of lifting of the eyes, or a movement of the eyebrows. The expressions are acquired by a characteristic part of each portion of the face image and the movement thereof. The collection unit 508A identifies the gesture of the user shown in the captured image and acquires statistical information about the gesture. For example, whether or not there is nodding or the like is extracted and analyzed from the gesture. The collection unit 508A executes such statistical processing on the captured images transmitted from the communication unit 205 of the cameras 26 of each of the vehicle cabin units (20D, 20E, 20F). The statistical information of the obtained facial expression and gesture of the user is stored in the storage unit 509 in association with the advertisement information displayed in the vehicle cabin units (20D, 20E, 20F). The facial expression and gesture of the user are examples of the "user reaction" in the present disclosure.

S2003

In step S2003, the controller 326A of the traveling unit 30A transmits the request signal requesting the water level data of the clean water tank 24 to the water level gauge 23. The water level gauge 23 measures the water level according to the received request signal. The measured water level is returned to the communication unit 321. The controller 326A determines whether or not the water level in the clean water tank 24 is equal to or less than the predetermined value. It is assumed that the water level in the clean water tank 24 is determined to be higher than the predetermined value since the users do not often visit the vehicle cabin unit 20D and the free sample of the detergent is not used.

S2004

In step S2004, the communication unit 321 of the traveling unit 30A requests the captured image showing the scenery outside the vehicle from the communication unit 205 of the camera 26 installed in each of the vehicle cabin units (20D, 20E, 20F). In the vehicle cabin units (20D, 20E, 20F), the imaging unit 206 changes the light irradiation direction of the camera 26 and the condenser lens direction such that the imaging direction of the camera 26 faces the outside of the vehicle and captures the image of the scenery outside the vehicle, in response to the request.

S2005

In step S2005, the captured image captured by the imaging unit 206 of the camera 26 installed in each of the vehicle cabin units (20D, 20E, 20F) in step S2004 is transmitted from the communication unit 205 of the camera 26 to the communication unit 321 of the control device 35A of the traveling unit 30A. In the traveling unit 30A, the communication unit 321 analyzes the IP address of the transmission source and determines whether or not the received captured image is the image transmitted from the vehicle cabin units (20D, 20E) in the communicable area of the same WiFi access point AP1 as the traveling unit 30A.

S2006

In step S2006, for the captured image determined to be transmitted from the vehicle cabin units (20D, 20E) in step S2005, the movement analysis unit 327 analyzes the hand and foot directions of the person shown in the captured image to specify the movement direction of the person. The movement analysis unit 327 acquires statistical information on the specified movement direction of the person. The movement analysis unit 327 specifies the direction in which the largest number of people move for each of the vehicle cabin units 20D, 20E. The movement analysis unit 327 uses the IP address of the transmission source, which is the information attached when the captured images are transmitted from the respective cameras 26 of the vehicle cabin units (20D, 20E), to specify the current positions of the vehicle cabin units (20D, 20E). The new disposition place of the vehicle cabin unit 20D is set to an intersection (an example of a candidate point where the advertisement activity of the present disclosure is performed) of a line extending from the current position of the vehicle cabin unit 20D in the direction in which the largest number of people move and a line extending from the current position of the vehicle cabin unit 20E in the direction in which the largest number of people move. In a case where the movement analysis unit 327 is unable to decide the intersection, a place where the vehicle cabin unit 20D is moved by a predetermined distance from the current position of the vehicle cabin unit 20D in the direction in which the largest number of people move is decided as the new disposition place of the vehicle cabin unit 20D. The movement analysis unit 327 inputs the decided new disposition place to the route generation unit 322 and instructs the route generation unit 322 to generate a movement route (an example of "instructing the first unit to move the second unit" in the present disclosure). The movement analysis unit 327 analyzes the hand, foot, and the like orientations of the person shown in the captured image to specify the movement direction of the person for the captured image determined to be transmitted from each of the vehicle cabin units (20D, 20E). The analysis to specify the direction is an example of "acquiring the second information related to the movement of the person within the first predetermined range from the place where the second unit is disposed" in the present disclosure. The fact that the water level in the clean water tank 24 is higher than the predetermined value in step S2003 is an example of the "first information related to the advertisement activity" in the present disclosure.

S2007

In step S2007, the position information acquisition unit 324A acquires current position information of the traveling unit 30A. The route generation unit 322 generates a movement route from the current point to the new disposition place of the vehicle cabin unit 20D. The controller 326A uses the generated movement route to generate the drive control signal to drive the wheels. The drive control signal is transmitted to the drive unit 325, and the drive unit 325 drives the drive wheels according to the received drive control signal. Such processing is executed to move the traveling unit 30A from the current point to the new disposition place.

S2008

In step S2008, the controller 326A of the traveling unit 30A transmits the request signal requesting the water level data to the water level gauge 23 provided in the clean water tank 24 of the vehicle cabin unit 20D disposed at the new disposition place. The water level gauge 23 measures the water level according to the received request signal. The measured water level is returned to the communication unit 321. The controller 326A determines whether or not the water level in the clean water tank 24 is equal to or less than the predetermined value. It is assumed that the water level in the clean water tank 24 is determined to be equal to or less than the predetermined value since a large number of users visit the vehicle cabin unit 20D disposed at the new disposition place and many free samples of detergent are used.

S2009

In step S2009, the controller 326A generates the operation control signal to operate the pump 32. The generated operation control signal is transmitted to the pump 32 by the communication unit 321, and the pump 32 operates. The opening-degree control signal to open the valve 25 is also generated by the controller 326A. The generated opening-degree control signal is transmitted to the valve 25 by the communication unit 321, and the valve 25 opens. The pump 32 and the valve 25 are operated in this manner, and thus the clean water is replenished from the clean water tank 31 installed in the traveling unit 30A to the clean water tank 24 installed in the vehicle cabin unit 20D.

Effect of Second Embodiment

With the information collection system 1A described above, in a case where the clean water stored in the clean water tank 24 of the vehicle cabin unit 20D is not reduced, the vehicle cabin unit 20D is moved to the place expected to attract customers. Therefore, the efficiency of collecting the facial expression and gesture of the user when using the free sample is improved. In a case where the clean water stored in the clean water tank 24 of the vehicle cabin unit 20D is reduced, the clean water is supplied from the clean water tank 31 installed in the traveling unit 30A to the clean water tank 24 of the vehicle cabin unit 20A. Therefore, it is possible to continue using the free sample. Therefore, a situation in which the user cannot use the free sample due to the lack of clean water is suppressed, and the efficiency of collecting the facial expression and gesture of the user when using the free sample is improved.

With the above information collection system 1A, the determination as to whether or not to change the disposition place of the vehicle cabin unit 20D is executed by the traveling unit 30A acquiring the water storage amount information of the clean water tank 24 installed in the vehicle cabin unit 20D connected to the traveling unit, instead of the user reaction information collected in the information processing device 50A. In a case where the disposition place of the vehicle cabin unit 20D is changed, the control device 35A of the traveling unit 30A selects the candidate point for the new disposition place of the vehicle cabin unit 20D. Therefore, the processing of changing the disposition of the vehicle cabin unit 20D is not executed in the information processing device 50A, and the processing load of the information processing device 50A is reduced. Therefore, for example, even in a case where the total amount of data size of the captured images collected from the cameras 26 installed in the respective vehicle cabin units (20D, 20E, 20F) to the information processing device 50A becomes large, the processing load is dispersed. Therefore, the advertiser can quickly obtain the collection result of the facial expression and gesture of the user.

Other Modification Examples

In a case where wastewater is generated by using the free sample of the advertisement in the vehicle cabin unit 20D, the vehicle cabin unit 20D and the traveling unit 30A may include a wastewater tank. In a case where an amount of water stored in the wastewater tank provided in the vehicle cabin unit 20D is equal to or larger than a predetermined value, the controller 326 of the control device 35 of the traveling unit 30A may discharge the wastewater from the wastewater tank provided in the vehicle cabin unit 20D to the wastewater tank provided in the traveling unit 30A. In a case where the amount of water stored in the wastewater tank installed in the traveling unit 30A is equal to or larger than the predetermined value, the traveling unit 30A may be separated from the vehicle cabin unit 20D and autonomously travel to a wastewater treatment facility at another place to discharge the wastewater.

The vehicle cabin unit 20D may include a battery instead of the clean water tank 24. In the vehicle cabin unit 20, the user may try a free sample of an electronic device that uses the electric power supplied from the battery. The traveling unit 30A may include a charger capable of charging the battery of the vehicle cabin unit 20, and the electric power may be replenished from the charger of the traveling unit 30A to the battery of the vehicle cabin unit 20D. Similarly, the vehicle cabin unit 20D may include a gas stove and a gas cylinder instead of the clean water tank 24. In the vehicle cabin unit 20D, the user may use the gas stove to heat and cook the food sample and taste the food. The traveling unit 30A may include another gas cylinder capable of supplying gas to the gas stove of the vehicle cabin unit 20D, and the gas may be replenished from the gas cylinder of the traveling unit 30A to the gas stove of the vehicle cabin unit 20D.

In the second embodiment, the images of the scenery outside the vehicle captured by the camera 26 are collected in the information processing device 50A, and the information processing device 50A may determine whether or not to change the disposition place of the vehicle cabin unit 20D. The vehicle cabin units (20D, 20E, 20F) according to the second embodiment may be disposed in a place where positioning is possible by the GPS module, of course.

The numbers of the vehicle cabin units 20 and the traveling units 30 are not limited to the above numbers. The number of vehicle cabin units 20 to be moved and a time zone are not limited to the examples of the above embodiments, and the movement instruction unit 504 of the information processing device 50 may issue the movement instruction such that a plurality of units moves in the same time zone. The movement instruction signal generated by the movement instruction unit 504 may include a signal to cause one traveling unit 30 to be connected to and separated from the vehicle cabin units 20 and the vehicle cabin units 20 to move to a new disposition place.

The above embodiments are merely examples, and the present disclosure may be modified and implemented as appropriate within a scope not departing from the gist thereof.

The configurations and processing described in the present disclosure can be freely combined and implemented as long as no technical contradiction occurs.

The processing described as being performed by one device may be shared and executed by a plurality of devices. Alternatively, the processing described as being performed by different devices may be executed by one device. In a computer system, it is possible to flexibly change the hardware configuration (server configuration) for realizing each function.

The present disclosure can also be realized by supplying a computer with a computer program that implements the functions described in the above embodiments, and one or more processors included in the computer read and execute the program. Such a computer program may be provided to the computer by a non-transitory computer readable storage medium connectable to a system bus of the computer, or may be provided to the computer through a network. Examples of the non-transitory computer-readable storage medium include any type of disc such as a magnetic disc (floppy (registered trademark) disc, hard disk drive (HDD), or the like) and an optical disc (CD-ROM, DVD disc, Blu-ray disc, or the like), a read solely memory (ROM), a random access memory (RAM), an EPROM, an EEPROM, a magnetic card, a flash memory, an optical card, and any type of medium suitable for storing an electronic command.

What is claimed is:

1. An information processing device comprising a controller that executes
acquiring at least one of first information related to advertisement activity from a second unit that is usable as a vehicle cabin of a vehicle and is disposed separately from a first unit having a drive unit of the vehicle, the second unit being provided for the advertisement activity, and second information related to a movement of a person within a first predetermined range from a place where the second unit is disposed, and
instructing the first unit to move the second unit to a movement destination decided based on at least one of the acquired first information and the acquired second information, wherein the instructing the first unit to move the second unit includes instructing the first unit to select a candidate point where the advertisement activity is performed and move the second unit to the selected candidate point.

2. The information processing device according to claim 1, wherein the first information includes a reaction of a user in a case where a target of the advertisement activity is used or attribute information of the user.

3. The information processing device according to claim 1, wherein the acquiring the second information includes identifying a movement direction of a person from an image captured by a camera, acquiring information generated from a device carried by a person from a network to which the device is connected, or acquiring information on an event performed within the first predetermined range from the place where the second unit is disposed.

4. The information processing device according to claim 1, wherein the controller further executes processing for guiding a person within a second predetermined range from the place where the second unit is disposed to the second unit.

5. The information processing device according to claim 1, wherein:
plurality of the second units are disposed;
the acquiring the first information includes acquiring the first information for each of the second units;
the acquiring the second information includes acquiring the second information for each of the second units; and the instructing the first unit to move the second unit includes instructing the first unit to move at least one of the second units based on the first information and the second information.

6. The information processing device according to claim 1, wherein:
the first unit and the second unit are able to load an object used for the advertisement activity; and
the controller issues an instruction to replenish the object used for the advertisement activity from the first unit to the second unit.

7. An information processing system comprising:
a first unit having a drive unit of a vehicle;
a second unit that is usable as a vehicle cabin of the vehicle and is disposed separately from the first unit; and
a controller that executes acquiring at least one of first information related to advertisement activity from the second unit that is provided for the advertisement activity or second information related to a movement of a person within a first predetermined range from a place where the second unit is disposed, and instructing the first unit to move the second unit to a movement destination decided based on at least one of the acquired first information and the acquired second information, wherein the instructing the first unit to move the second unit includes instructing the first unit to select a candidate point where the advertisement activity is performed and move the second unit to the selected candidate point.

8. The information processing system according to claim 7, wherein the first information includes a reaction of a user in a case where a target of the advertisement activity is used or attribute information of the user.

9. The information processing system according to claim 7, Wherein the acquiring the second information includes identifying a movement direction of a person from an image captured by a camera, acquiring information generated from a device carried by a person from a network to which the device is connected, or acquiring information on an event performed within the first predetermined range from the place Where the second unit is disposed.

10. The information processing system according to claim 7, wherein the controller further executes processing for guiding a person within a second predetermined range from the place where the second unit is disposed to the second unit.

11. The information processing system according to claim 7, wherein:
a plurality of the second units are disposed;
the acquiring the first information includes acquiring the first information for each of the second units;
the acquiring the second information includes acquiring the second information for each of the second units; and
the instructing the first unit to move the second unit includes instructing the first unit to move at least one of the second units based on the first information and the second information.

12. The information processing system according to claim 7, wherein:
the first unit and the second unit are able to load an object used for the advertisement activity; and
the controller issues an instruction to replenish the object used for the advertisement activity from the first unit to the second unit.

13. An information processing method executed by a computer, the method comprising:
acquiring at least one of first information related to advertisement activity from a second unit that is usable as a vehicle cabin of a vehicle and is disposed separately from a first unit having a drive unit of the vehicle, the second unit being provided for the advertisement activity, and second information related to a movement of a person within a first predetermined range from a place where the second unit is disposed; and
instructing the first unit to move the second unit to a movement destination decided based on at least one of the acquired first information and the acquired second information, wherein the instructing the first unit to move the second unit includes instructing the first unit to select a candidate point where the advertisement activity is performed and move the second unit to the selected candidate point.

14. The information processing method according to claim 13, wherein the first information includes a reaction of a user in a case where a target of the advertisement activity is used or attribute information of the user.

15. The information processing method according to claim 13, wherein the acquiring the second information includes identifying a movement direction of a person from an image captured by a camera, acquiring information generated from a device carried by a person from a network to which the device is connected, or acquiring information on an event performed within the first predetermined range from the place where the second unit is disposed.

16. The information processing method according to claim 13, further comprising executing processing for guiding a person within a second predetermined range from the place where the second unit is disposed to the second unit.

17. The information processing method according to claim 13, wherein:
a plurality of the second units are disposed;
the acquiring the first information includes acquiring the first information for each of the second units;
the acquiring the second information includes acquiring the second information for each of the second units;
the instructing the first unit to move the second unit includes instructing the first unit to move at least one of the second units based on the first information and the second information;
the first unit and the second unit are able to load an object used for the advertisement activity; and
issuing an instruction to replenish the object used for the advertisement activity from the first unit to the second unit.

* * * * *